(12) United States Patent
Alpert et al.

(10) Patent No.: US 9,811,905 B2
(45) Date of Patent: Nov. 7, 2017

(54) ANOMALY DETECTION IN MEDICAL IMAGERY

(71) Applicant: International Business Machines Corporation, Armonk, NY (US)

(72) Inventors: Sharon Alpert, Rehovot (IL); Pavel Kisilev, Maalot (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/427,073

(22) Filed: Feb. 8, 2017

(65) Prior Publication Data

US 2017/0148166 A1 May 25, 2017

Related U.S. Application Data

(63) Continuation of application No. 14/178,313, filed on Feb. 12, 2014.

(51) Int. Cl.
*G06K 9/00* (2006.01)
*G06T 7/00* (2017.01)
*G06T 5/40* (2006.01)
*G06T 7/13* (2017.01)
*G06K 9/46* (2006.01)
*G06K 9/62* (2006.01)

(52) U.S. Cl.
CPC .......... *G06T 7/0012* (2013.01); *G06K 9/4671* (2013.01); *G06K 9/6267* (2013.01); *G06T 5/40* (2013.01); *G06T 7/13* (2017.01); *G06T 2207/10088* (2013.01); *G06T 2207/30068* (2013.01); *G06T 2207/30096* (2013.01)

(58) Field of Classification Search
None
See application file for complete search history.

(56) References Cited

U.S. PATENT DOCUMENTS

| | | | |
|---|---|---|---|
| 7,738,683 | B2 | 6/2010 | Cahill et al. |
| 7,933,436 | B2 | 4/2011 | Gundel et al. |
| 8,164,039 | B2 | 4/2012 | Bovik et al. |
| 2007/0223807 | A1* | 9/2007 | Yankelevitz ............. G06K 9/00 382/159 |
| 2010/0104155 | A1 | 4/2010 | Chen et al. |
| 2012/0121159 | A1 | 5/2012 | Hernandez-Cisneros |
| 2013/0051676 | A1 | 2/2013 | Wehnes et al. |

OTHER PUBLICATIONS

Margolin et al. "What makes a patch distinct?," 2013, IEEE, CVPR, Jun. 2013.*
Ramirez-Villegas et al., "Microcalcification Detection in Digitized Mammograms: A Neurobiologically-Inspired Approach", 2012, Chapter 8, Digital Image Processing, Stanciu (Ed.), InTech.*

(Continued)

*Primary Examiner* — Jason Heidemann

(57) ABSTRACT

A method comprising using at least one hardware processor for computing a patch distinctiveness score for each of multiple patches of a medical image, computing a shape distinctiveness score for each of multiple regions of the medical image, and computing a saliency map of the medical image, by combining the patch distinctiveness score and the shape distinctiveness score.

18 Claims, 15 Drawing Sheets
(12 of 15 Drawing Sheet(s) Filed in Color)

(56) References Cited

OTHER PUBLICATIONS

Papadopoulos et al., "An automatic microcalcification detection system based on a hybrid neural network classifier", Artificial Intelligence in Medicine, vol. 25, Issue 2, Jun. 2002, pp. 149-167.
Oliver et al., "Automatic microcalcification and cluster detection for digital and digitised mammograms". Knowledge Based Systems, vol. 28, Apr. 2012, pp. 68-75.
Torrent et al., "A supervised micro-calcification detection approach in digitised mammograms", 17th IEEE International conference on Image Processing ICIP, Sep. 2010, pp. 4345-4348.
Boccignone et al. "Computer aided detection of microcalcifications in digital mammograms." Computers in Biology and Medicine, vol. 30, pp. 267-286, 2000.
Zhang et al., "Neural vs. statistical classifier in conjunction with genetic algorithm based feature selection." Pattern Recognition Letters, vol. 26, issue 7, May 2005, pp. 909-919.
D'Elia at al., "Detection of microcalcifications clusters in mammograms through TS-MRF segmentation and SVM-based classification." Proceedings of the 17th International Conference on Pattern Recognition, ICPR Aug. 2004. vol. 3, pp. 742-745.
D'Elia et al., "Detection of Clusters of Microcaicifications in Mammograms: A Multi Classifier Approach." 21st IEEE International Symposium on Computer-Based Medical Systems, CBMS '08, Jun. 2008, pp. 572-577.
Tourassi et al., "Computer-assisted detection of mammographic masses: A template matching scheme based on mutual information." Medical Physics 30, pp. 2123-2130, Aug. 2003.
Haindl et al., "Unsupervised detection of mammogram regions of interest" Knowledge-Based Intelligent Information and Engineering Systems, Lecture Notes in Computer Science vol. 4694, 2007, pp. 33-40.
Arai et al., "Automated Detection Method for Clustered Microcalcification in Mammogram Image Based on Statistical Textural Features", International Journal of Advanced Computer Science and Applications, vol. 3, No. 5, 2012.
Santra et al., "Pixcals Statistical Based Algorithm To Detect Microcalcifications on Mammograms", International Journal of Computational Intelligence Research , vol. 6 Issue 2, p. 275-283. Apr. 2010.
Kus et al., "Detection Of Microcalcication Clusters in Digitized X-Ray Mammograms Using Unsharp Masking and Image Statistics", Turkish Journal of electrical Engineering and Computer Science, Oct. 2013.
Zhang et al., "A Hybrid image Filtering Method For Computer-Aided Detection of Microcalcification Clusters in Mammograms", Hindawi Publishing corporation, Journal of Medical Engineering, 2013, Article ID 61524.
Rizzi et al., "A Fully Automatic System for Detection of Breast Microcaicification Clusters", Journal of Medical and biological engineering, 30(3), pp. 131-183, Dec. 2009.

* cited by examiner

ANOMALY DETECTION IN MEDICAL IMAGERY

CROSS-REFERENCE TO RELATED APPLICATIONS

This application is a continuation of U.S. patent application Ser. No. 14/178,313, filed Feb. 12, 2014, entitled "Anomaly Detection in Medical Imagery".

BACKGROUND

The present invention relates to the field of image analysis.

Detection of salient image regions in natural images has been at the focal point in research in recent years. The most appealing property of saliency algorithms is that they capture the most informative image location without learning any information on a particular scene. This make these kind of algorithms highly versatile and beneficial for a wide range of applications ranging from object detection to image compression. Natural image saliency algorithms differ from one other by the type of distinctness they rely on. Theses types of distinctness may be divided into three major categories: patch distinctiveness, color distinctiveness and human priors.

Patch distinctiveness calculates some distance measure between all (or nearly all) image patches with the same size. A patch may be considered salient if it is different from nearly all other or most of the other image patches. Color distinctiveness identifies image areas which have unique color characteristics as compared to all other image areas. Human priors involves incorporating known priors on image organization and human gaze. The most prominent is the human tendency to place the photographed subject around the center of the image.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: computing a patch distinctiveness score for each of multiple patches of a medical image; computing a shape distinctiveness score for each of multiple regions of the medical image; and computing a saliency map of the medical image, by combining the patch distinctiveness score and the shape distinctiveness score.

There is provided, in accordance with another embodiment, a computer program product comprising a non-transitory computer-readable storage medium having program code embodied therewith, the program code executable by at least one hardware processor to: compute a patch distinctiveness score for each of multiple patches of a medical image; compute a shape distinctiveness score for each of multiple regions of the medical image; and compute a saliency map of the medical image, by combining the patch distinctiveness score and the shape distinctiveness score.

In some embodiments, the method above is repeated for a plurality of medical images, to produce a plurality of saliency maps, wherein the plurality of medical images comprises images of normal and abnormal medical conditions; detecting salient regions in the plurality of saliency maps; classifying the salient regions by using a classifier to produce a medical condition classifier; conducting the method of claim 1 for an additional medical image, to receive a saliency map of the additional medical image; detecting one or more salient regions in the saliency map; and employing the medical condition classifier on the one or more salient regions of the additional medical image, to determine if the medical image is of a normal or an abnormal medical condition.

In some embodiments, the computing of the patch distinctiveness score comprises: applying principal component analysis (PCA) to the multiple patches, to represent each of the multiple patches by a set of expansion coefficients; and summing the set of expansion coefficients, to produce the patch distinctiveness score for each of the multiple patches.

In some embodiments, the computing of the shape distinctiveness score comprises: applying an edge detection algorithm to each of the multiple regions, to detect at least one pair of boundary edges in each of at least some of the multiple regions; for each pair of boundary edges (p, q): computing a length (lpq) of a vector $\overrightarrow{pq}$ and an orientation ($\psi$pq) of the vector $\overrightarrow{pq}$, computing a normal ($\theta_p$) to the boundary edge (p) and a normal ($\theta_q$) to the boundary edge (q), and computing histograms for lpq, $\psi$pq, $\theta_p$ and $\theta_q$; and computing the shape distinctiveness score for each of the at least some of the multiple regions, based on an entropy computation of the histograms.

In some embodiments, the computing of the shape distinctiveness score further comprises, following step (c), normalizing the histograms.

In some embodiments, each of the histograms comprises k bins, and wherein the entropy is computed by: $H(h_j)=-\Sigma_k h_j(k)\log(h_j(k))$.

In some embodiments, the shape distinctiveness score for each of the at least some of the multiple regions (R) is defined by:

$$SD(R) = \frac{1}{3}\left(H(h_\psi) + H(h_{\theta_p}) + H(h_{\theta_q})\right) - H(h_l).$$

In some embodiments, the combining of the patch distinctiveness score and the shape distinctiveness score comprises: decomposing the medical image to connected components based on the multiple regions shape distinctiveness score; and in each connected components, multiplying the patch distinctiveness score at the location of the maximal shape distinctiveness score with a Gaussian.

In some embodiments, the method further comprises using said at least one hardware processor for applying a mode seeking algorithm to the saliency map, to detect one or more salient regions; and applying a medical condition classifier to the salient regions, to classify the one or more salient regions.

In some embodiments, the plurality of medical images and the additional medical image are mammograms, and the abnormal medical condition is selected from the group consisting of: a microcalcifications and a tumor.

In some embodiments, the plurality of medical images and the additional medical image are angiograms, and the abnormal medical condition is blood vessel stenosis.

In some embodiments, the plurality of medical images and the additional medical image are MRI (magnetic resonance imaging) images, and the abnormal medical condition is a lesion.

In some embodiments, the plurality of medical images and the additional medical image are CT (computed tomography) images, and the abnormal medical condition is a lesion.

In some embodiments, the plurality of medical images and the additional medical image are ultrasound images, and the abnormal medical condition is a lesion.

In some embodiments, a division of the medical image into the multiple patches is different than a division of the medical image into the multiple regions.

In some embodiments, the program code is further executable by said at least one hardware processor to apply a mode seeking algorithm to the saliency map, to detect one or more salient regions; and apply a medical condition classifier to the one or more salient regions, to classify the one or more salient regions.

In some embodiments, the computation of the patch distinctiveness score, the shape distinctiveness score and the saliency map is performed for a plurality of medical images, to produce a plurality of saliency maps, wherein the plurality of medical images comprise images of normal and abnormal medical conditions, and wherein the program code is further executable by said at least one hardware processor to: detect salient regions in the plurality of saliency maps; classify the salient regions by using a classifier to produce a medical condition classifier; conduct the computation of the patch distinctiveness score, the shape distinctiveness score and the saliency map for an additional medical image; detect one or more salient regions in the saliency map; and employ the medical condition classifier on the one or more salient regions of the additional medical image, to determine if the medical image is of a normal or an abnormal medical condition.

In addition to the exemplary aspects and embodiments described above, further aspects and embodiments will become apparent by reference to the figures and by study of the following detailed description.

BRIEF DESCRIPTION OF THE FIGURES

The patent or application file contains at least one drawing executed in color. Copies of this patent or patent application publication with color drawing(s) will be provided by the Office upon request and payment of the necessary fee.

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Methods for detecting salient regions and abnormalities in medical images are disclosed herein. The disclosed methods may propose a measure of "medical saliency" that aims at identifying informative regions based solely on internal image statistics. The disclosed methods do not assume any prior information on the organization of the images but rather use a combination of patch and shape distinctiveness to compute the saliency score.

The term "patches", as referred to herein with respect to an image, may relate to relatively small areas of the image (i.e., relatively small with respect to the image).

The term "regions", as referred to herein with respect to an image, may relate to areas of the image, which are larger in size than patches.

The term "cues", as referred to herein with respect to an image, may relate to the statistics one may measure with respect to image values (i.e. patch stats, gradients etc.).

The term "priors", as referred to herein with respect to an image, may relate to information which may be received without considering the actual values, such as prior knowledge on natural image statistics.

Figure 1:
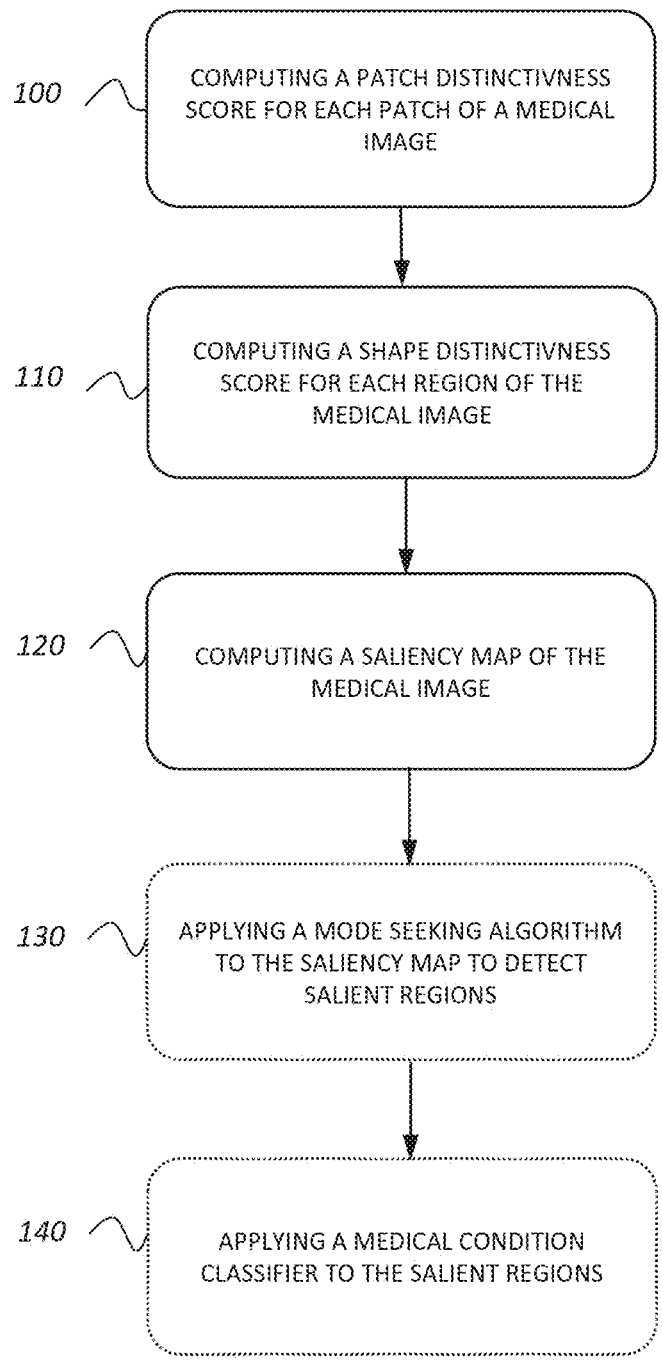
FIG. 1 shows a flow chart of a method, constructed and operative in accordance with an embodiment of the disclosed technique.

Reference is now made to FIG. 1, which shows a flow chart of a method, constructed and operative in accordance with the disclosed technique. In a step 100, a patch distinctiveness score may be computed for each of multiple patches of a medical image (herein below may be also referred as 'image'). The medical image may be divided into a plurality of patches. The patches may be equally sized and/or quadrangular and/or overlapping. The size or number of patches may be determined with respect to the size of the medical image. The patches may be determined to be small enough to allow detection of distinctiveness in the medical image. Furthermore, smaller patches may allow better resolution but may require greater computing time and/or power. The number of patches may range, for example, from 3 to 64. Patch distinctiveness score may determine the extent at which a patch may be different (i.e., a distance), with respect to some measure, from all other patches (or an average thereof) in the image. Such measure may be, for example, patterns, light intensity, colors, high-level cues and priors or a combination thereof. The medical image may be, for example, a mammogram, an angiogram, a CT image or an MRI image.

Computing distances between all image patches may be performed by computing the distance of each image patch from the 'average' patch along a corresponding principle axis. The aim is to locate patches which are very distinct from all other. As this may be a very laborious approach one can use a dimensionality reduction scheme to reduce the amount of computation needed. Such scheme is described in: Margolin, Ran, Ayellet Tal, and Lihi Zelnik-Manor, "What Makes a Patch Distinct?", IEEE CVPR 2013, which is incorporated herein by reference in its entirety. The scheme may include applying principal component analysis (PCA) to the patches. Thus, each of the multiple patches may be represented at the PCA space by a set of expansion coefficients. Summing of the set of expansion coefficients may produce the patch distinctiveness score for each of the patches.

In more detail, an image I may be divided into overlapping k×k patches. Initially, the PCA of the image patches may be computed. As a result, each vectorized patch $P_i$ may be represented by a set of expansion coefficients: $a_i^l = P_i \cdot PC_l$, $l=1 \ldots k^2$, where $PC_k$ is the $k_{th}$ principle component. Using this representation, the patch distinctiveness (PD) of a patch $P_i$ may be defined by: $PD(P_i) = \Sigma_k |a_k^i|$.

In a step 110, a shape distinctiveness score may be computed for each of multiple regions of the medical image. The medical image may be divided into multiple regions. The regions may be equally sized and/or may be quadrangular and/or may be overlapping. The size or number of regions may be determined with respect to the size of the medical image. Shape distinctiveness score may determine the extent at which a shape of a region may be prominent and distinct within a given image, and different from non-informative noisy regions.

The distinctiveness of a shape may be identified by utilizing both global and local shape features used for object detection, as described in: Alexander Toshev, Ben Taskar, and Kostas Daniilidis, "Shape-based object detection via boundary structure segmentation", Int. J. Comput. Vision, 99(2):123-146 (2012) which is incorporated herein by reference in its entirety. The global and local shape features may be used in an unsupervised setup.

Thus, the computing of the shape distinctiveness score may include applying an edge detection algorithm to each of the multiple regions, to detect at least one pair of boundary edges in each of at least some of the regions. For each pair of boundary edges (p, q), a length ($l_{pq}$) and an orientation ($\psi_{pq}$) of a vector $\vec{pq}$ may be computed. A normal ($\theta_p$) to the boundary edge (p) and a normal ($\theta_q$) to the boundary edge (q) may be computed as well. Following the above, histograms for $l_{pq}$, $\psi_{pq}$, $\theta_p$ and $\theta_q$ may be computed. The shape distinctiveness score may be computed then for at least some of the regions based on an entropy computation of the histograms.

In more detail, gradients of an image I may be computed using some edge detector algorithm (e.g., canny edge detector). Then, for each m×m region, the following set of shape features may be computed. Let p, q be a pair of boundary edges, extracted by the edge detection algorithm, in an m×m region R. To express the dependency between edges p and q one may compute the length $l_{pq}$ and the orientation $\psi_{pq}$ of the vector $\vec{pq}$. In order to capture more local shape information one may compute the normals $\theta_p$ and $\theta_q$ to the boundary at p and q relative to the orientation $\psi_{pq}$. Namely, $\theta_p = \theta'_p - \psi_{pq}$, $\theta_q = \theta'_q - \psi_{pq}$, where $\theta'_p$, $\theta'_q$ are the boundary edge orientations at p and q respectively. Thus, each pair of boundary points p and q may be represented as a four-tuple: $f_{pq} = (l_{pq}, \psi_{pq}, \theta_p, \theta_q)$. Thus, a region may be characterized by four histograms $h_f = (h_l, h_\psi, h_{\theta_p}, h_{\theta_q})$ by calculating histograms of the four-tuple $f_{pq} = (l_{pq}, \psi_{pq}, \theta_p, \theta_q)$ values, wherein each of the four value histograms may contain k bins. The calculated histograms may be then normalized.

Figure 2B:
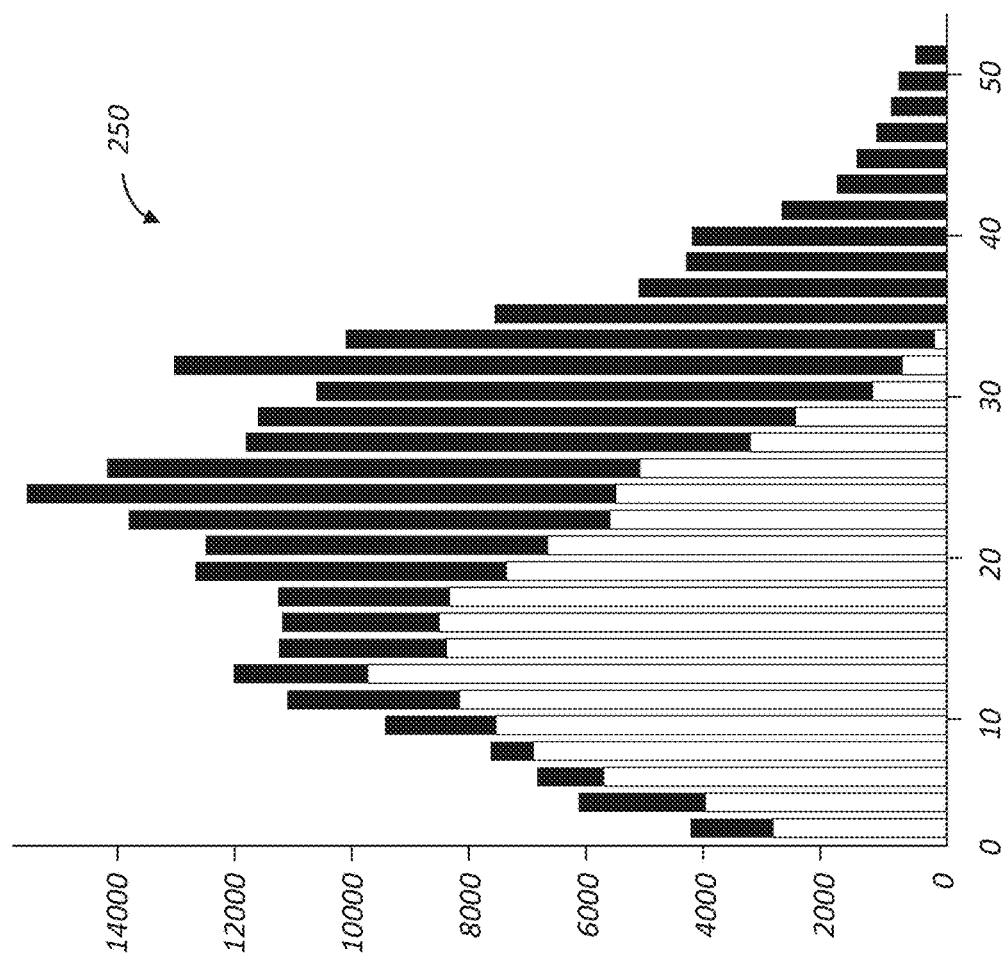
FIG. 2B shows histograms showing the distances of informative (white with black borders) and non-informative (solid black) regions in the image of FIG. 2A.
Figure 2A:
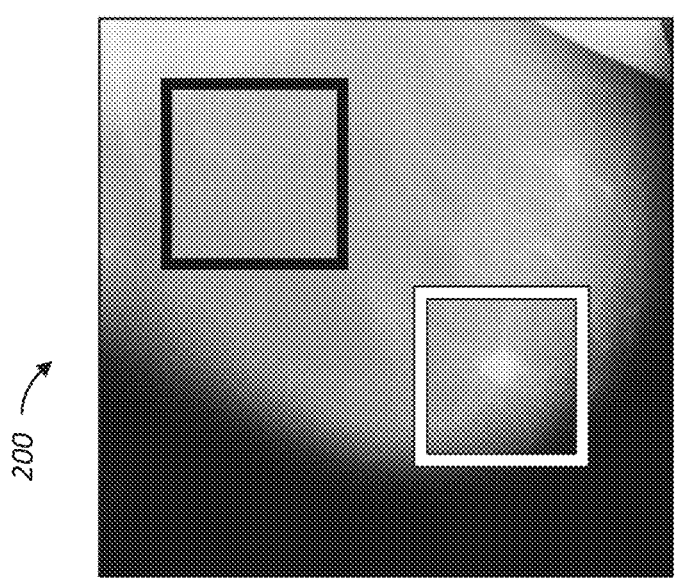
FIG. 2A shows an image of a mammogram of a breast including a tumor.

Reference is now made to FIGS. 2A and 2B. FIG. 2A shows an image 200 of a mammogram of a breast including a tumor. FIG. 2A includes a white rectangle framing the tumor (i.e., an informative area) and a black rectangle framing normal tissue (i.e., non-informative area). FIG. 2B shows histograms 250 showing the distances $l_{pq}$ (represented by the x axis) of informative (white with black borders) and non-informative (solid black) regions in the image of FIG. 2A. [As described above, shape saliency may be aimed at finding image locations with rich shape information. However, rich shape information may be also found in noisy image locations. To counter that and to find meaningful regions, one may seek rich local shape information (white with black borders) while requiring the distances between boundary points being much sparser than non-informative locations (indicated in solid black). It should be noted that the histogram in the informative location is narrower.

The entropy of the histograms may be computed by: $H(h_f) = -\Sigma_k h_f(k) \log(h_f(k))$. Using this formulation, the shape distinctiveness (SD) score of region R may be defined by:

$$SD(R) = \frac{1}{3}\left(H(h_\psi) + H(h_{\theta_p}) + H(h_{\theta_q})\right) - H(h_l).$$

In a step 120, a saliency map of the medical image may be computed by combining the patch distinctiveness score and the shape distinctiveness score. The combining of the scores may be performed by decomposing the medical image to connected components based on the multiple regions shape distinctiveness score. A threshold value may be determined for the SD score. Adjacent regions having an SD score higher than the threshold value may be considered as a connected component. The term "adjacent regions", in this context, may refer to a collection of two or more regions, wherein each region is adjacent (i.e., overlapping or having a common border) to at least one other region from the collection of regions. In each connected component, a patch distinctiveness score, at the location of the connected component's maximal shape distinctiveness score, may be selected and multiplied by a Gaussian. For example, in the below detailed experiments, a Gaussian with a standard deviation, which was empirically set to 10,000, was used.

Thus, in order to construct the combined saliency score, one may first compute the PD score. Then, the image may be divided into m×m regions and the SD score may be computed in each region. The resulting SD score map may be then decomposed into its connected components. Optionally, regions whose maximal score is smaller than the determined threshold value may be discarded. For example, in the below detailed experiments, the threshold was empirically set to one. Finally, the remaining regions may be used to amplify the PD score by multiplying it with a Gaussian at the locations of the maximal SD score in each connected component.

In an optional step 130, a mode seeking algorithm may be applied to the saliency map, to detect one or more salient regions in the saliency map. Such mode seeking algorithm may be, for example, mean-shift clustering.

Figure 3:
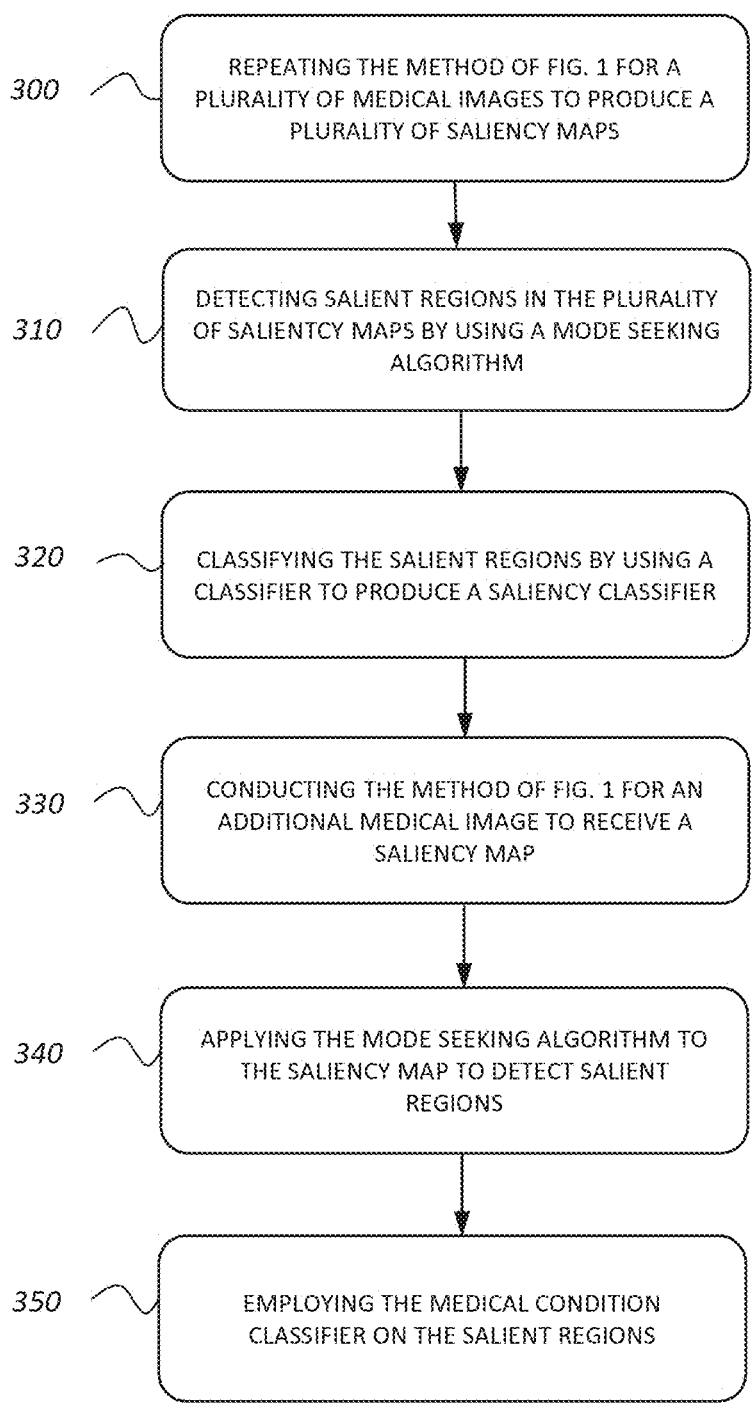
FIG. 3 shows a flow chart of a method for classifying salient regions based on a mode seeking algorithm, constructed and operative in accordance with another embodiment of the disclosed technique.

In a further optional step 140, a medical condition classifier may be applied to the salient regions in order to classify the salient regions. Such classification may be, for example, classification of MCCs to benign or malignant. A method for classifying salient regions in the saliency map based on a mode seeking algorithm is shown in FIG. 3 and disclosed herein below.

In some embodiments, the division of the medical image into the multiple patches may be different than the division of the medical image into the multiple regions. For example, the patches and the regions may be each equally sized, while the size of the regions may be larger than the size of the patches.

Figure 4B:
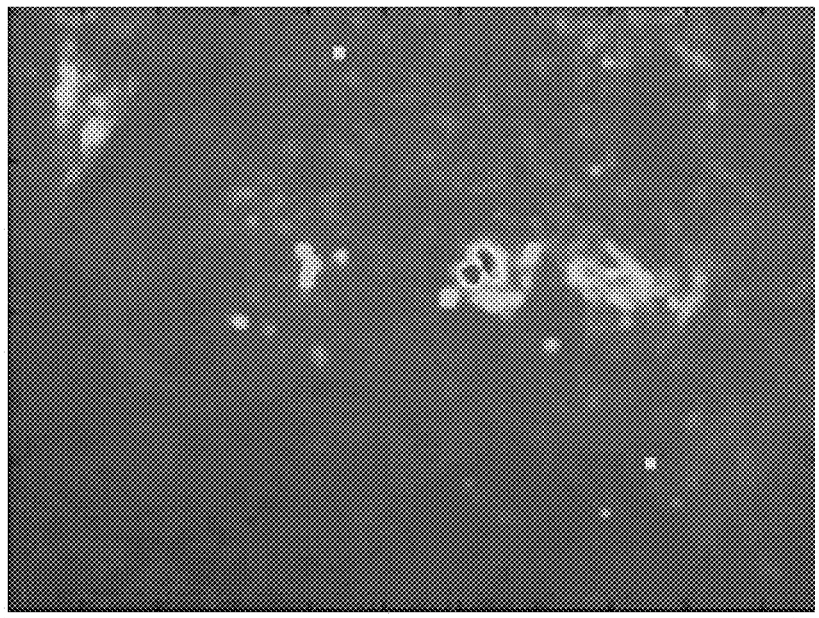
FIG. 4B shows a saliency map of the mammogram of FIG. 4A computed according to the method of FIG. 1.
Figure 4A:
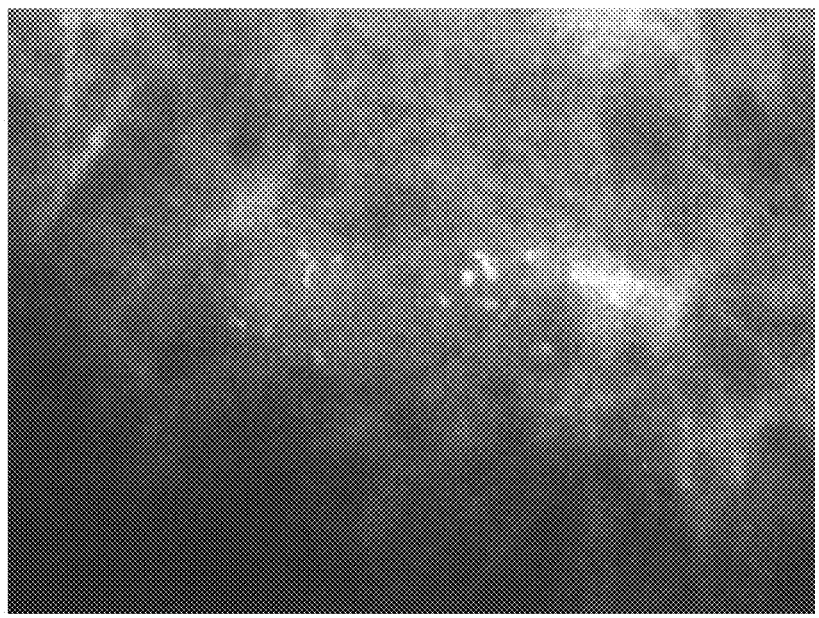
FIG. 4A shows a mammogram of a breast including microcalcification (MCC) obtained from the Digital Database for Screening Mammography (DDSM)
Figure 5B:
FIG. 5B shows a saliency map of the mammogram of FIG. 5A computed according to the method of FIG. 1.
Figure 5A:
FIG. 5A shows another mammogram of a breast including microcalcification obtained from the DDSM.
Figure 6B:
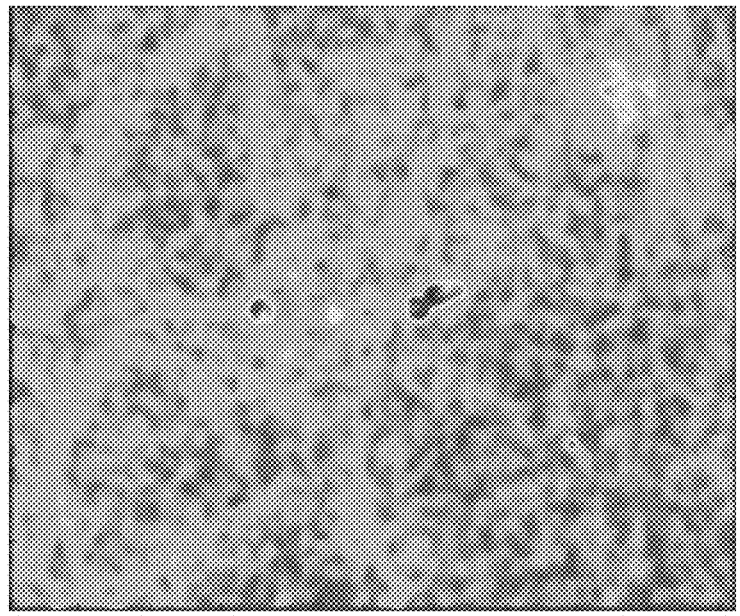
FIG. 6B shows a saliency map of the mammogram of FIG. 6A computed according to the method of FIG. 1.
Figure 6A:
FIG. 6A shows a further mammogram of a breast including microcalcification obtained from the DDSM.

Reference is now made to FIGS. 4A-6B which show exemplary mammogram showing breast microcalcification obtained from the DDSM and their saliency maps computed according to the method of FIG. 1. FIG. 4A shows a mammogram of a breast including microcalcification obtained from the DDSM. FIG. 4B shows a saliency map of the mammogram of FIG. 4A computed according to the method of FIG. 1. FIG. 5A shows another mammogram of a breast including microcalcification obtained from the DDSM. FIG. 5B shows a saliency map of the mammogram of FIG. 5A computed according to the method of FIG. 1. FIG. 6A shows a further mammogram of a breast including microcalcification obtained from the DDSM. FIG. 6B shows a saliency map of the mammogram of FIG. 6A computed according to the method of FIG. 1. One may see that informative regions in the exemplary mammogram received high saliency values.

Figure 7B:
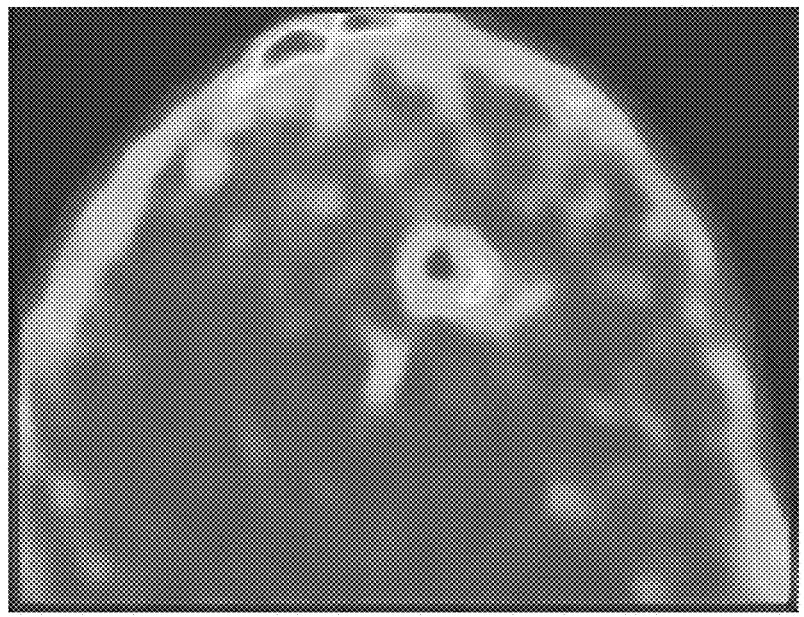
FIG. 7B shows a saliency map of the mammogram of FIG. 7A computed according to the method of FIG. 1.
Figure 7A:
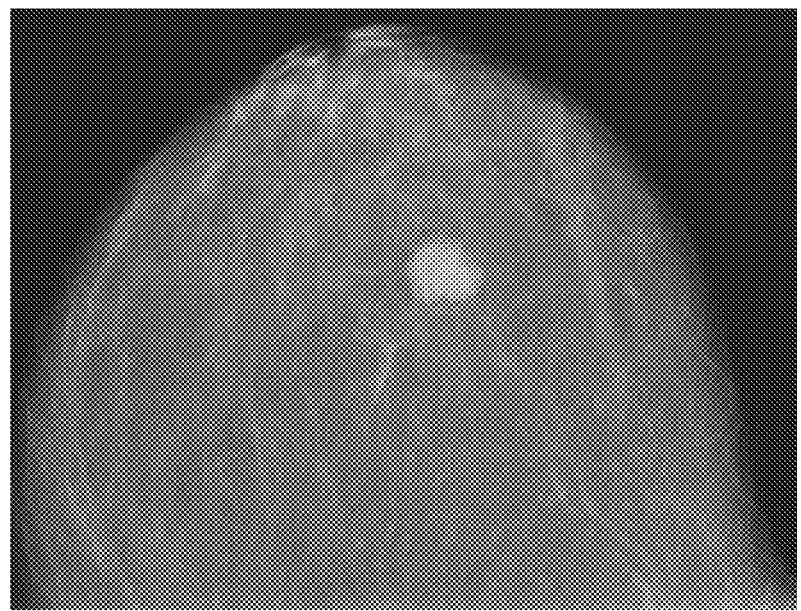
FIG. 7A shows a mammogram of a breast including a tumor obtained from the DDSM.
Figure 8B:
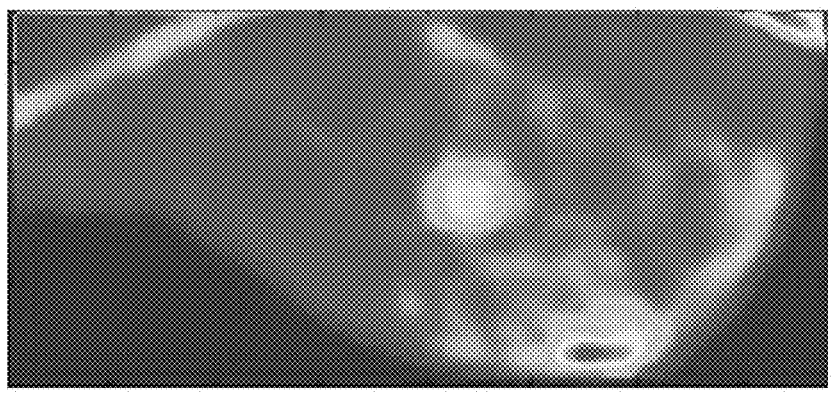
FIG. 8B shows a saliency map of the mammogram of FIG. 8A computed according to the method of FIG. 1.
Figure 8A:
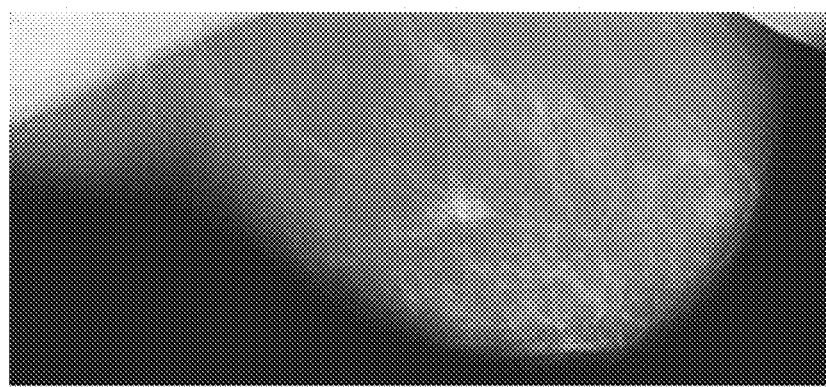
FIG. 8A shows another mammogram of a breast including a tumor obtained from the DDSM.
Figure 9B:
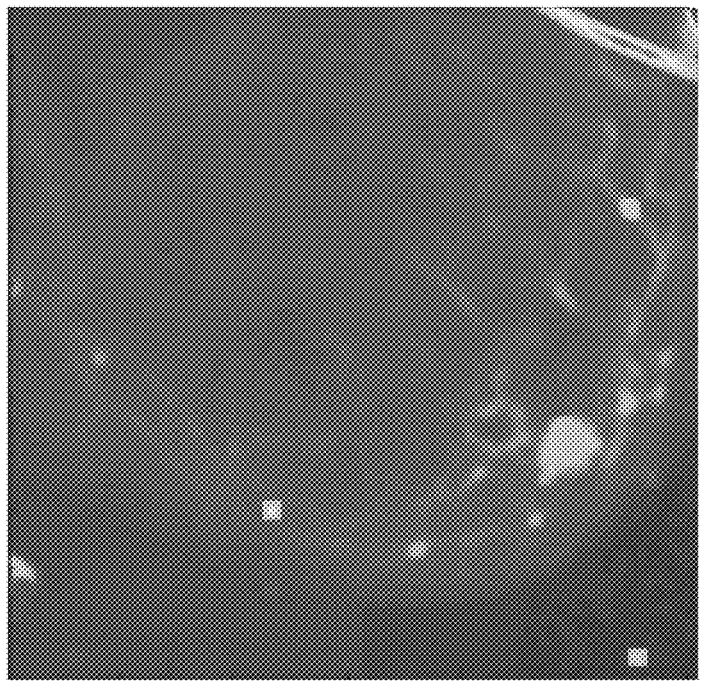
FIG. 9B shows a saliency map of the mammogram of FIG. 9A computed according to the method of FIG. 1.
Figure 9A:
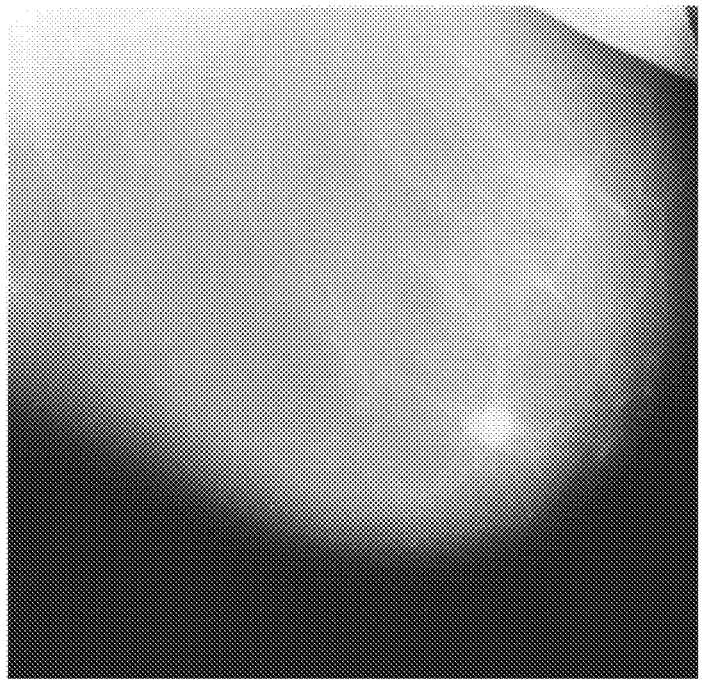
FIG. 9A shows a further mammogram of a breast including a tumor obtained from the DDSM.

Reference is now made to FIGS. 7A-9B which show exemplary mammogram showing breast tumors obtained from the DDSM and their saliency maps computed according to the method of FIG. 1. FIG. 7A shows a mammogram of a breast including a tumor obtained from the DDSM. FIG. 7B shows a saliency map of the mammogram of FIG. 7A computed according to the method of FIG. 1. FIG. 8A shows another mammogram of a breast including a tumor obtained from the DDSM. FIG. 8B shows a saliency map of the mammogram of FIG. 8A computed according to the method of FIG. 1. FIG. 9A shows a further mammogram of a breast including a tumor obtained from the DDSM. FIG. 9B shows a saliency map of the mammogram of FIG. 9A computed according to the method of FIG. 1. One may see that informative regions in the exemplary mammogram received high saliency values.

Figure 10A:
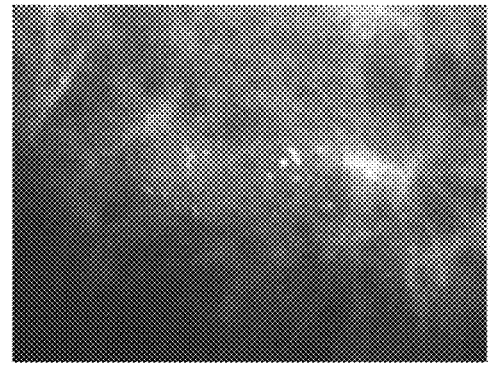
FIG. 10A shows an exemplary input image of a breast including microcalcification.
Figure 10B:
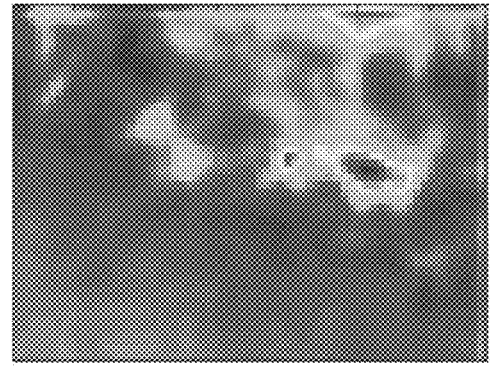
FIG. 10B shows a saliency map of the image of FIG. 4A computed according to the method of FIG. 3.
Figure 10C:
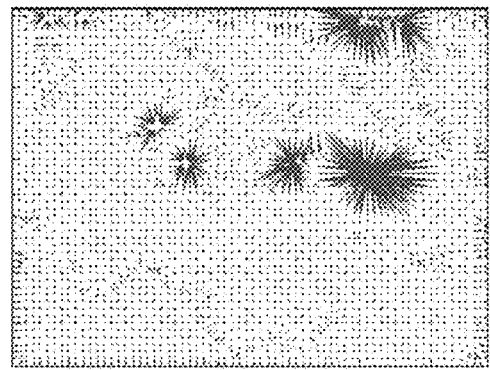
FIG. 10C shows modes of the saliency map of FIG. 4B detected according to the method of FIG. 3.
Figure 10D:
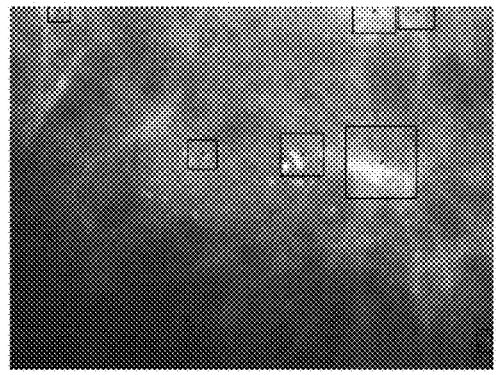
FIG. 10D shows salient regions detected according to the method of FIG. 3.

Reference is now made to FIGS. 3 and 10A-10D. FIG. 3 shows a flow chart of a method for classifying salient regions based on a mode seeking algorithm, constructed and operative in accordance with another embodiment of the disclosed technique. FIG. 10A shows an exemplary input image of a breast including microcalcification. FIG. 10B shows a saliency map of the image of FIG. 10A computed according to the method of FIG. 1. FIG. 10C shows modes of the saliency map of FIG. 10B detected according to the method of FIG. 3. FIG. 10D shows salient regions detected according to the method of FIG. 3.

In a step 300, the method of FIG. 1 may be repeated for a plurality of medical images, to produce a plurality of saliency maps. The plurality of medical images may include images of normal and abnormal medical conditions. The medical images may be obtained from a dedicated database, such as the Digital Database for Screening Mammography (DDSM).

In some embodiments, the medical images may be mammograms, and the abnormal medical condition may be a microcalcification and/or a tumor. In some embodiments, the medical images may be angiograms, and the abnormal medical condition may be blood vessel stenosis. In some embodiments, the medical images may be MRI (magnetic resonance imaging), CT (computed tomography) or ultrasound images, and the abnormal medical condition may be a lesion.

With reference to FIG. 10A, an input image of a breast including microcalcification obtained from the DDSM is shown. With reference to FIG. 10B, a saliency map of the input image is shown. The saliency map may be received by applying the method of FIG. 1 on the input image.

In a step 310, salient regions may be detected in the plurality of saliency maps by using a mode seeking algorithm. With reference to FIG. 10B, one may observe that around each peak of the saliency map there is a region with decreasing score proportional to the distance from the peak. This stems from the fact that nearby image patches may be often correlated, which results in relatively high saliency score (compared to the peak). Since image regions are the ones of interest, rather than only the peaks, an identification of the regions that, in some sense, 'belong' to each individual peak, may be desired. Such regions are hereby called the "modes" of the saliency map, and its corresponding regions in the image are hereby called "salient regions". Locating these modes may be similar to locating the modes of some function f. This may be accomplished by a mode seeking procedure such as the Mean Shift (MS).

In order to find the modes, one may consider each point in the saliency map as a 3-tuple $(x_i, y_i, s_i)$ where $s_i \in (0, 1]$ is the normalized saliency score and $x_i, y_i$ its corresponding location. If, for example, the MS algorithm is directly applied to the set $S=\{(x_i, y_i, s_i)|1\ldots n\}$, the algorithm would group together close points with similar scores rather than finding the entire mode. This may indicate that the saliency maps should not be simply considered as an additional dimension but rather be treated as a histogram, where higher saliency score $s_i$ may indicate high density at $(x_i, y_i)$.

To incorporate this into the MS algorithm one may first need to understand its mode of operation. The MS algorithm is a procedure for locating the maxima of a density function given discrete data, sampled from that function. The algorithm may iteratively improve the maximal density locations by applying Kernel density estimation steps from an initial estimation. As explained above, the saliency score may represent the density at each location. Thus, in the MS algorithm, score $s_i$ may be used to weight the distance of the point $(x_i, y_i)$ from the current maximal density estimation in the Kernel density estimation step. The weight of a point $(x_i, y_i)$ with score $s_i$ may be defined by $$w_i = \frac{1}{\log(1 - s_i)}.$$

The salient regions may be computed by aggregating together locations which share the same maximal density point. Maximal density points with very little points associated with, may be discarded. With reference to FIG. 10C, each arrow indicates its corresponding maximal density location computed according to the above. Thus, each arrow is oriented towards the saliency peak to which the arrow's location (i.e., image location) belongs. The saliency peaks are indicated in red in FIG. 10B.

In a step 320, the salient regions may be classified by using a well known classifier, such as support vector machine (SVM), random forest or deep belief network, to produce a medical condition classifier. Optionally, filters, such as difference of Gaussians (DOG) filters, may be further applied to achieve features enhancement. For example, the salient regions may be classified using a simple SVM classifier with difference of Gaussians (DOG) filters to produce a medical condition classifier.

In a step 330, the method of FIG. 1 may be conducted for an additional medical image to receive a saliency map of the additional medical image. In some embodiments, the additional medical image may be a mammogram, and the abnormal medical condition may be a microcalcification or a tumor. In some embodiments, the additional medical image may be an angiogram, and the abnormal medical condition may be blood vessel stenosis. In some embodiments, the additional medical image may be an MRI (magnetic resonance imaging), CT (computed tomography) or ultrasound image, and the abnormal medical condition may be a lesion.

In a step 340, the mode seeking algorithm may be applied to the saliency map of the additional medical image, to detect one or more salient regions in the saliency map. This step may be conducted according to step 310 with the required modifications.

In a step 350, the medical condition classifier may be employed on the one or more salient regions of the additional medical image, to determine if the salient regions and therefore the medical image is of a normal or an abnormal medical condition. For example, MCC shown in mammograms may be classified as benign or malignant.

Experimental Results

To test the methods disclosed above, multiple detection experiments were performed on different modalities including detection of tumors and microcalsifications in mammograms, stenoses in angiography images and lesions in brain MRI. The patch distinctiveness in these experiments was determined with respect to the light intensity (i.e., brightness) of the images.

Microcalsifications

The method of FIG. 3 was applied to a benign-versus-malignant image classification task, while using an SVM based classifier and DOG filters at six scales. The experiment included 100 benign and 100 malignant/premalignant, MCC containing, images from the DDSM. The entire set of images was randomly divided into a training set, containing 70 benign and 70 premalignant images, and a testing set, containing 30 benign and 30 premalignant images. The SVM based classifier was then trained on the detected areas of the training set. Following that, the method of FIG. 1 was applied to the testing set. The trained model (i.e., the medical condition classifier) was used to classify images from the testing set. This experiment was repeated 20 times with randomly selected train and test sets. The median over 20 runs classification accuracy (ACC) rate was found to be 80%.

Brain MRI and Blood Vessels Angiogram

Figure 11B:
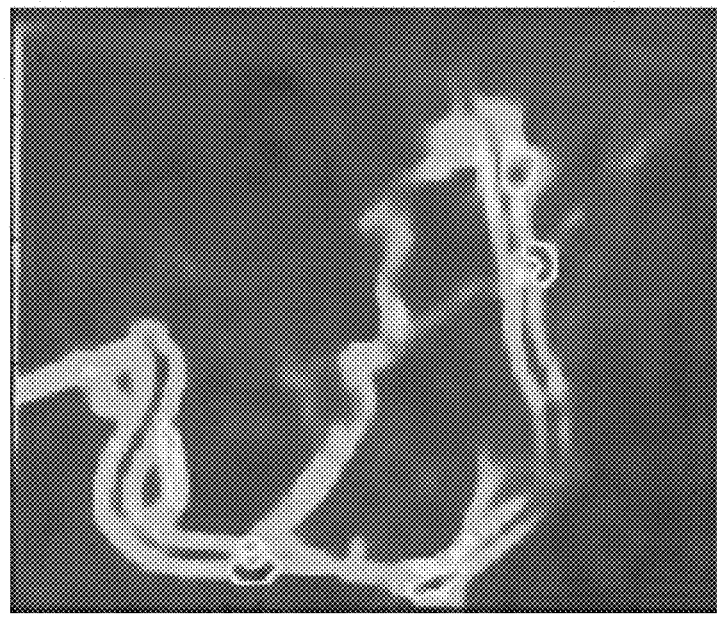
FIG. 11B shows a saliency map of the angiography of FIG. 11A computed according to the method of FIG. 1.
Figure 11A:
FIG. 11A shows an angiography of blood vessels having stenosis obtained from the DDSM.
Figure 12B:
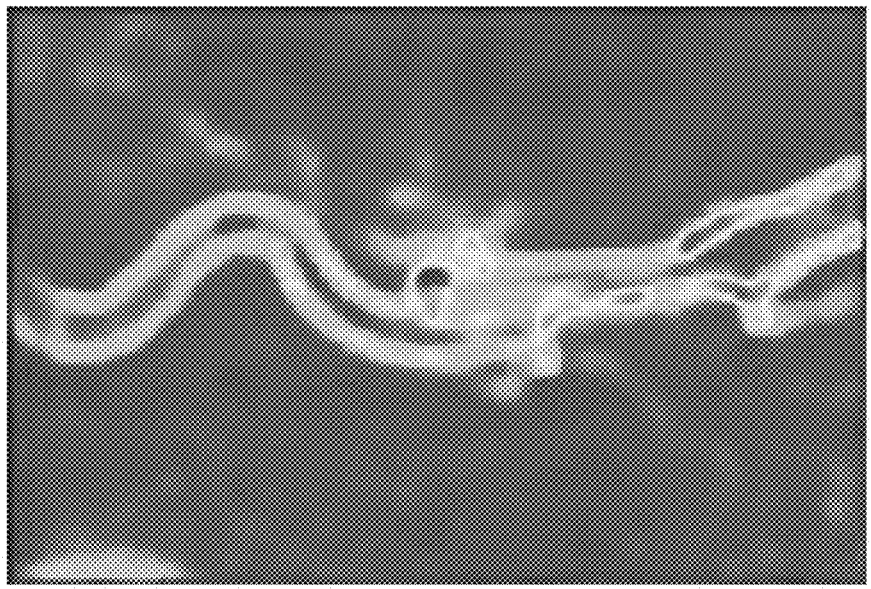
FIG. 12B shows a saliency map of the angiography of FIG. 12A computed according to the method of FIG. 1.
Figure 12A:
FIG. 12A shows another angiography of blood vessels having stenosis obtained from the DDSM.
Figure 13B:
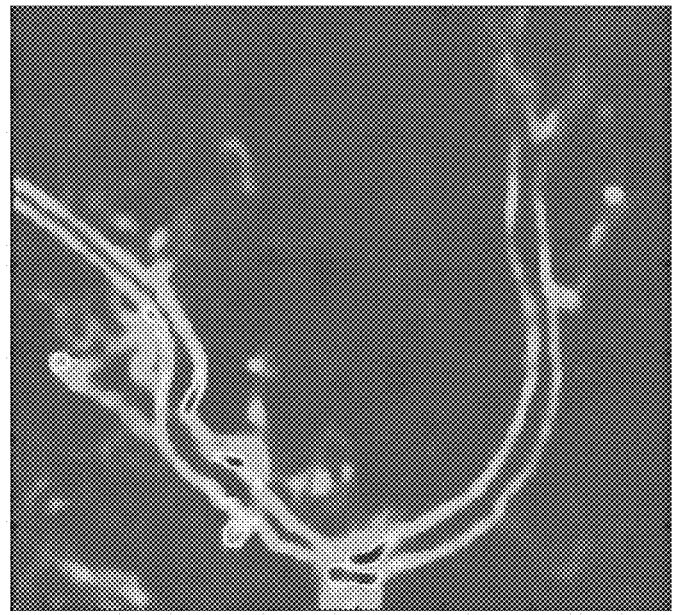
FIG. 13B shows a saliency map of the angiography of FIG. 13A computed according to the method of FIG. 1.
Figure 13A:
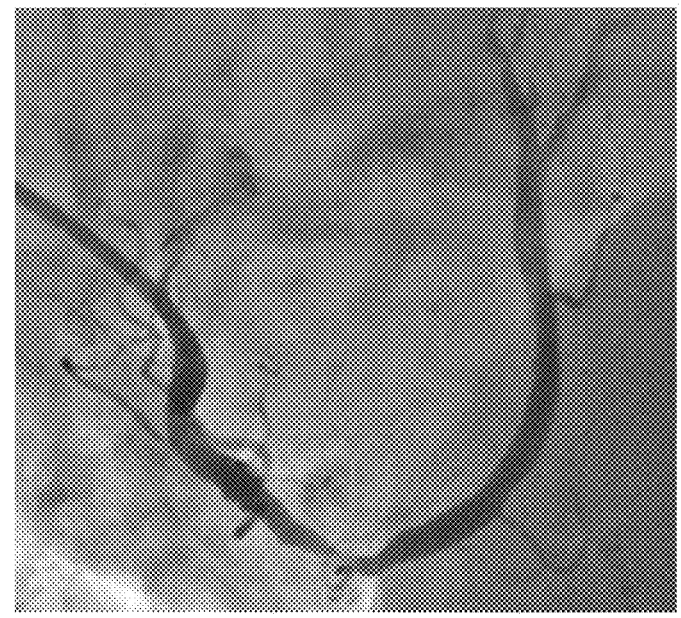
FIG. 13A shows a further angiography of blood vessels having stenosis obtained from the DDSM.

To further test the disclosed methods, the method of FIG. 1 was applied to angiogram images showing stenosis of blood vessels. FIGS. 11A-13B show exemplary angiography images of blood vessels having stenosis obtained from the DDSM and their saliency map obtained by the method of FIG. 1. FIG. 11A shows an angiography of blood vessels having stenosis obtained from the DDSM. FIG. 11B shows a saliency map of the angiography of FIG. 11A computed according to the method of FIG. 1. FIG. 12A shows another angiography of blood vessels having stenosis obtained from the DDSM. FIG. 12B shows a saliency map of the angiography of FIG. 12A computed according to the method of FIG. 1. FIG. 13A shows a further angiography of blood vessels having stenosis obtained from the DDSM. FIG. 13B shows a saliency map of the angiography of FIG. 13A computed according to the method of FIG. 1.

One may see that the stenosis locations have high saliency values and are clearly separated. One should note that the algorithm was exactly as the one applied to the breast tumors and MCC, without any parameter tuning.

Figure 14B:
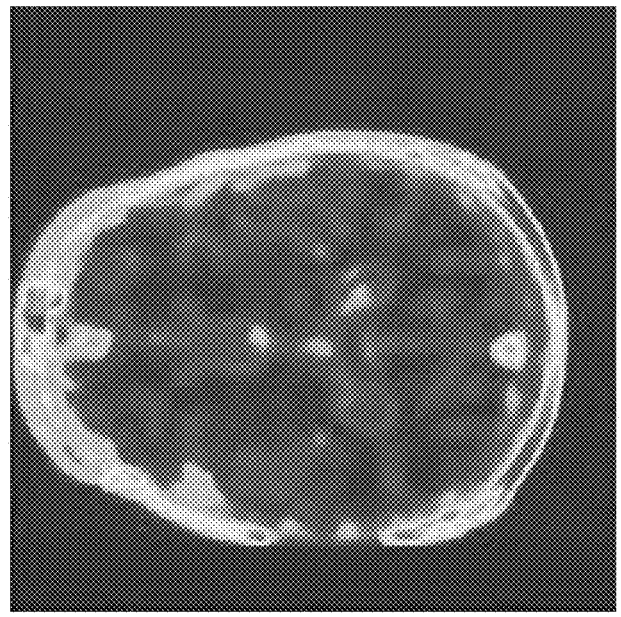
FIG. 14B shows a saliency map of the MRI image of FIG. 14A computed according to the method of FIG. 1.
Figure 14A:
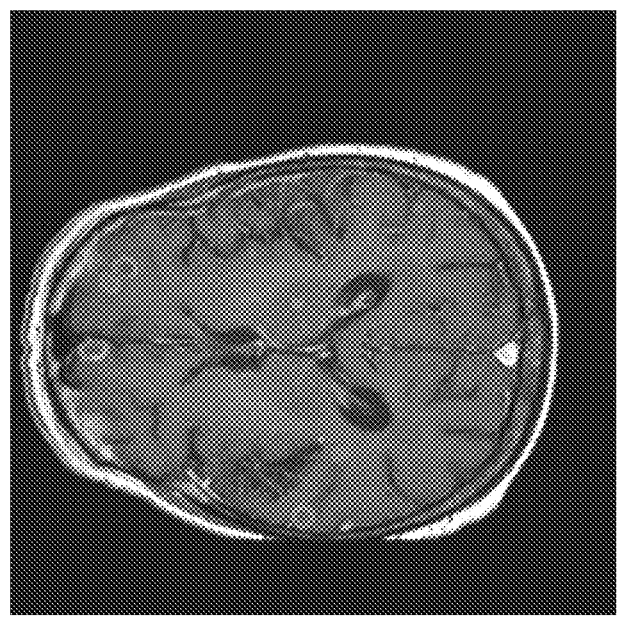
FIG. 14A shows an MRI image of a brain with space occupying lesions obtained from the DDSM.
Figure 15B:
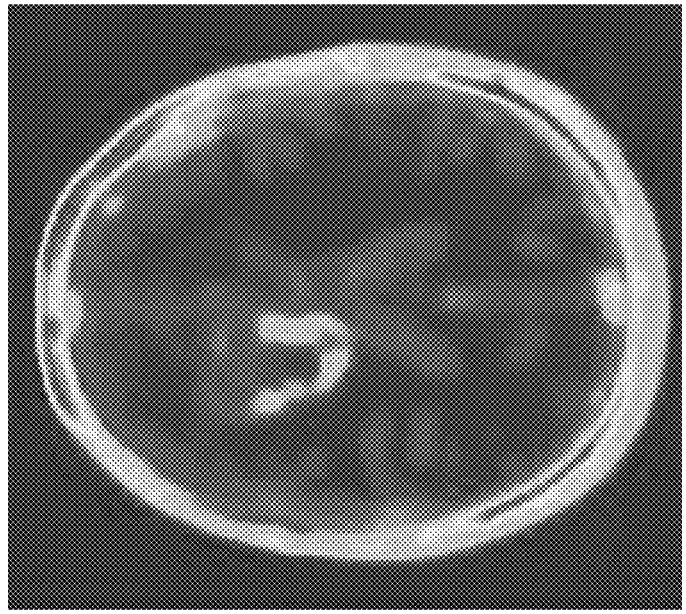
FIG. 15B shows a saliency map of the MRI image of FIG. 15A computed according to the method of FIG. 1.
Figure 15A:
FIG. 15A shows another MRI image of a brain with space occupying lesions obtained from the DDSM.

Finally, the method of FIG. 1 was applied to MRI images including space occupying brain lesions. FIGS. 14A-15B show exemplary MRI images of brains with space occupying lesions obtained from the DDSM. FIG. 14A shows an MRI image of a brain with space occupying lesions obtained from the DDSM. FIG. 14B shows a saliency map of the MRI image of FIG. 14A computed according to the method of FIG. 1. FIG. 15A shows another MRI image of a brain with space occupying lesions obtained from the DDSM. FIG. 15B shows a saliency map of the MRI image of FIG. 15A computed according to the method of FIG. 1.

The lesions have high saliency score as compared to healthy brain tissue which has low score. Here, as well, the method of FIG. 1 was used as is, without any parameter tuning, which may demonstrate its versatility.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
computing a patch distinctiveness score for each of multiple patches of a medical image;
computing a shape distinctiveness score for each of multiple regions of the medical image, wherein said computing of the shape distinctiveness score comprises:
applying an edge detection algorithm to each of the multiple regions, to detect at least one pair of boundary edges in each of at least some of the multiple regions,
for each pair of boundary edges (p, q):
(a) computing a length ($l_{pq}$) of a vector $\vec{(pq)}$ and an orientation ($\psi_{pq}$) of the vector $\vec{(pq)}$,
(b) computing a normal ($\theta_p$) to the boundary edge (p) and a normal ($\theta_q$) to the boundary edge (q), and
(c) computing histograms for $l_{pq}$, $\psi_{pq}$, $\theta_p$ and $\theta_q$, and computing the shape distinctiveness score for each of the at least some of the multiple regions, based on an entropy computation of the histograms; and
computing a saliency map of the medical image, by combining the patch distinctiveness score and the shape distinctiveness score.

2. The method according to claim 1, wherein said computing of the patch distinctiveness score comprises:
applying principal component analysis (PCA) to the multiple patches, to represent each of the multiple patches by a set of expansion coefficients; and
summing the set of expansion coefficients, to produce the patch distinctiveness score for each of the multiple patches.

3. The method according to claim 1, wherein said computing of the shape distinctiveness score further comprises, following step (c), normalizing the histograms.

4. The method according to claim 1, wherein each of the histograms comprises k bins, and wherein the entropy is computed by:

$H(h_j) = -\Sigma_k h_j(k) \log(h_j(k))$.

5. The method according to claim 4, wherein the shape distinctiveness score for each of the at least some of the multiple regions (R) is defined by:

$$SD(R) = \frac{1}{3}\left(H(h_\psi) + H(h_{\theta_p}) + H(h_{\theta_q})\right) - H(h_l).$$

6. The method according to claim 1, wherein said combining of the patch distinctiveness score and the shape distinctiveness score comprises:
decomposing the medical image to connected components based on the multiple regions shape distinctiveness score; and
in each connected component, multiplying the patch distinctiveness score at the location of the maximal shape distinctiveness score by a Gaussian.

7. The method according to claim 6, further comprising using said at least one hardware processor for:
applying a mode seeking algorithm to the saliency map, to detect one or more salient regions; and
applying a medical condition classifier to the salient regions, to classify the one or more salient regions.

8. A method comprising:
repeating the method of claim 1 for a plurality of medical images, to produce a plurality of saliency maps, wherein the plurality of medical images comprises images of normal and abnormal medical conditions;
detecting salient regions in the plurality of saliency maps;
classifying the salient regions by using a classifier to produce a medical condition classifier;
conducting the method of claim 1 for an additional medical image, to receive a saliency map of the additional medical image;
detecting one or more salient regions in the saliency map; and
employing the medical condition classifier on the one or more salient regions of the additional medical image, to determine if the medical image is of a normal or an abnormal medical condition.

9. The method according to claim 8, wherein the plurality of medical images and the additional medical image are mammograms, and the abnormal medical condition is selected from the group consisting of: a microcalcifications and a tumor.

10. The method according to claim 8, wherein the plurality of medical images and the additional medical image are angiograms, and the abnormal medical condition is blood vessel stenosis.

11. The method according to claim 8, wherein the plurality of medical images and the additional medical image are MRI (magnetic resonance imaging) images, and the abnormal medical condition is a lesion.

12. The method according to claim 8, wherein the plurality of medical images and the additional medical image are CT (computed tomography) images, and the abnormal medical condition is a lesion.

13. The method according to claim 8, wherein the plurality of medical images and the additional medical image are ultrasound images, and the abnormal medical condition is a lesion.

14. The method according to claim 1, wherein a division of the medical image into the multiple patches is different than a division of the medical image into the multiple regions.

15. A computer program product comprising a non-transitory computer-readable storage medium having program code embodied therewith, the program code executable by at least one hardware processor to:
compute a patch distinctiveness score for each of multiple patches of a medical image;
compute a shape distinctiveness score for each of multiple regions of the medical image, wherein said computing of the shape distinctiveness score comprises:
applying an edge detection algorithm to each of the multiple regions, to detect at least one pair of boundary edges in each of at least some of the multiple regions,
for each pair of boundary edges (p, q):
(a) computing a length ($l_{pq}$) of a vector $\vec{(pq)}$ and an orientation ($\psi_{pq}$) of the vector $\vec{(pq)}$, (b) computing a normal ($\theta_p$) to the boundary edge (p) and a normal ($\theta_q$) to the boundary edge (q), and (c) computing histograms for $l_{pq}$, $\psi_{pq}$, $\theta_p$ and $\theta_q$, and computing the shape distinctiveness score for each of the at least some of the multiple regions, based on an entropy computation of the histograms; and compute a saliency map of the medical image, by combining the patch distinctiveness score and the shape distinctiveness score.

16. The computer program product according to claim 15, wherein the computation of the patch distinctiveness score comprises:

applying principal component analysis (PCA) to the multiple patches, to represent each of the multiple patches by a set of expansion coefficients; and summing the set of expansion coefficients, to produce the patch distinctiveness score for each of the multiple patches.

17. The computer program product according to claim 15, wherein the program code is further executable by said at least one hardware processor to:

apply a mode seeking algorithm to the saliency map, to detect one or more salient regions; and apply a medical condition classifier to the one or more salient regions, to classify the one or more salient regions.

18. The computer program product of claim 15, wherein the computation of the patch distinctiveness score, the shape distinctiveness score and the saliency map is performed for a plurality of medical images, to produce a plurality of saliency maps, wherein the plurality of medical images comprise images of normal and abnormal medical conditions, and wherein the program code is further executable by said at least one hardware processor to:

detect salient regions in the plurality of saliency maps;

classify the salient regions by using a classifier to produce a medical condition classifier;

conduct the computation of the patch distinctiveness score, the shape distinctiveness score and the saliency map for an additional medical image;

detect one or more salient regions in the saliency map; and employ the medical condition classifier on the one or more salient regions of the additional medical image, to determine if the medical image is of a normal or an abnormal medical condition.

* * * * *